United States Patent [19]

Griffiths

[11] 4,355,683
[45] Oct. 26, 1982

[54] SYSTEM OF MOISTURE AND TEMPERATURE CONDITIONING AIR USING A SOLAR POND

[75] Inventor: William C. Griffiths, Lebanon, N.J.

[73] Assignee: Midland-Ross Corporation, Cleveland, Ohio

[21] Appl. No.: 262,047

[22] Filed: May 11, 1981

[51] Int. Cl.³ .............................. F24F 3/14; F24J 3/02
[52] U.S. Cl. ........................................ 165/60; 126/415; 126/436; 261/141; 261/146
[58] Field of Search ............... 126/415, 416, 430, 436; 165/3, 19, 60; 261/127, 141, 146, 149, 151; 236/44 B, 44 C

[56] References Cited

U.S. PATENT DOCUMENTS

| | | | |
|---|---|---|---|
| 1,101,901 | 6/1914 | Braemer | 236/44 C |
| 2,239,595 | 4/1941 | Cummings | 261/141 |
| 2,445,199 | 7/1948 | Williams | 165/19 |
| 2,871,107 | 1/1959 | Hartman | 165/19 |
| 3,169,575 | 2/1965 | Engalitcheff | 165/60 |
| 3,894,528 | 7/1975 | Stubblefield | 126/433 |
| 3,929,435 | 12/1975 | Engalitcheff | 261/146 |
| 4,063,419 | 12/1977 | Garrett | 126/415 |
| 4,189,848 | 2/1980 | Ko et al. | 126/433 |
| 4,287,721 | 9/1981 | Robison | 165/60 |
| 4,326,923 | 4/1982 | Mortenson | 126/415 |

*Primary Examiner*—Daniel J. O'Connor
*Attorney, Agent, or Firm*—Harlan E. Hummer

[57] ABSTRACT

An air conditioning system and/or a heating system is described in combination with a solar pond, especially a pond which is of the gradient type, wherein it is important to maintain a concentration of salt which increases with the depth of the pond. The pond is regenerated, that is, the salt concentration gradient is maintained, by components of the air conditioning system, or by special concentrator towers wherein moisture is removed from brine that is circulated to the towers from the pond.

13 Claims, 13 Drawing Figures

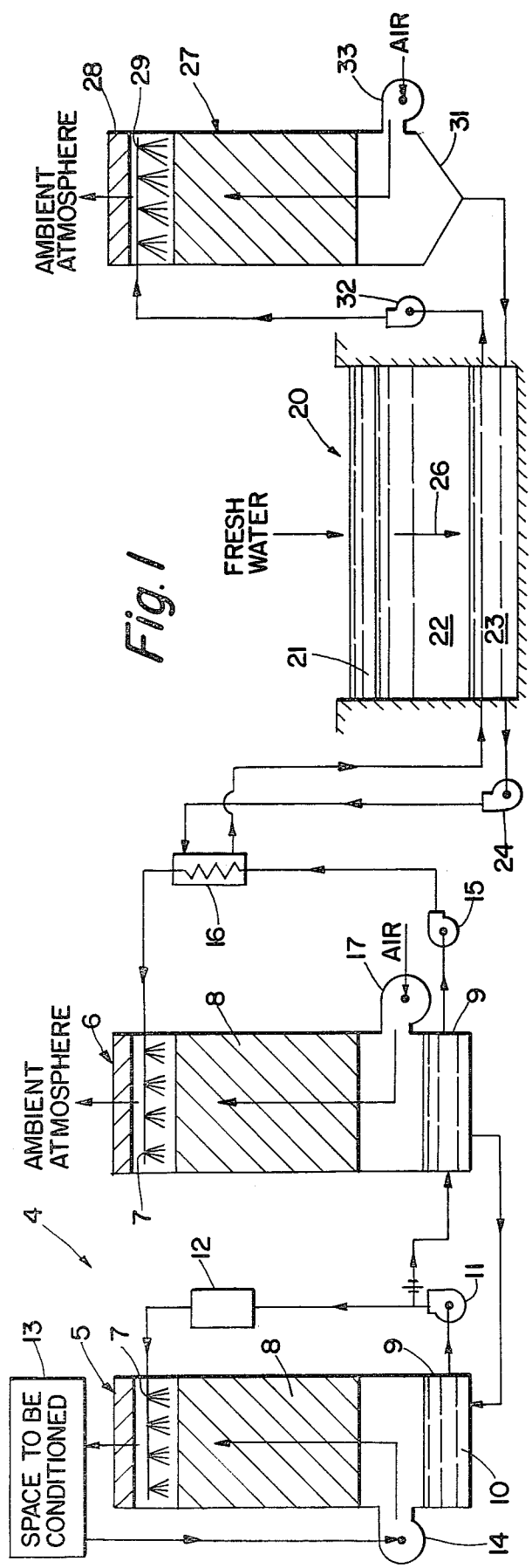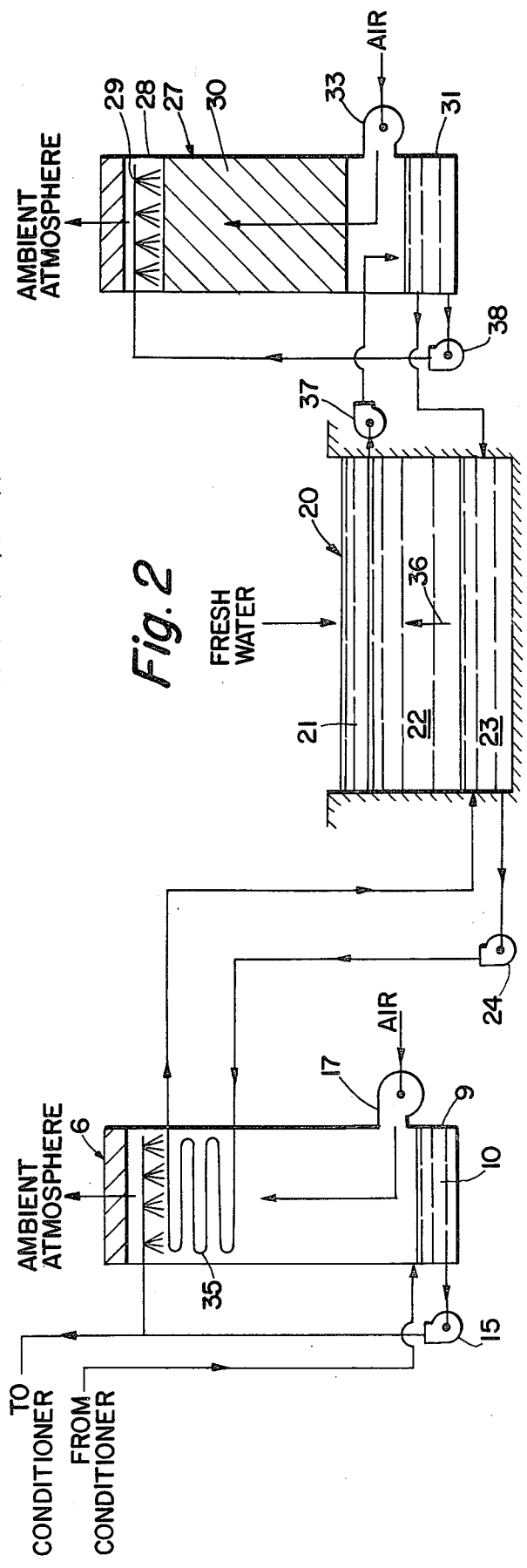
Fig. 1
Fig. 2

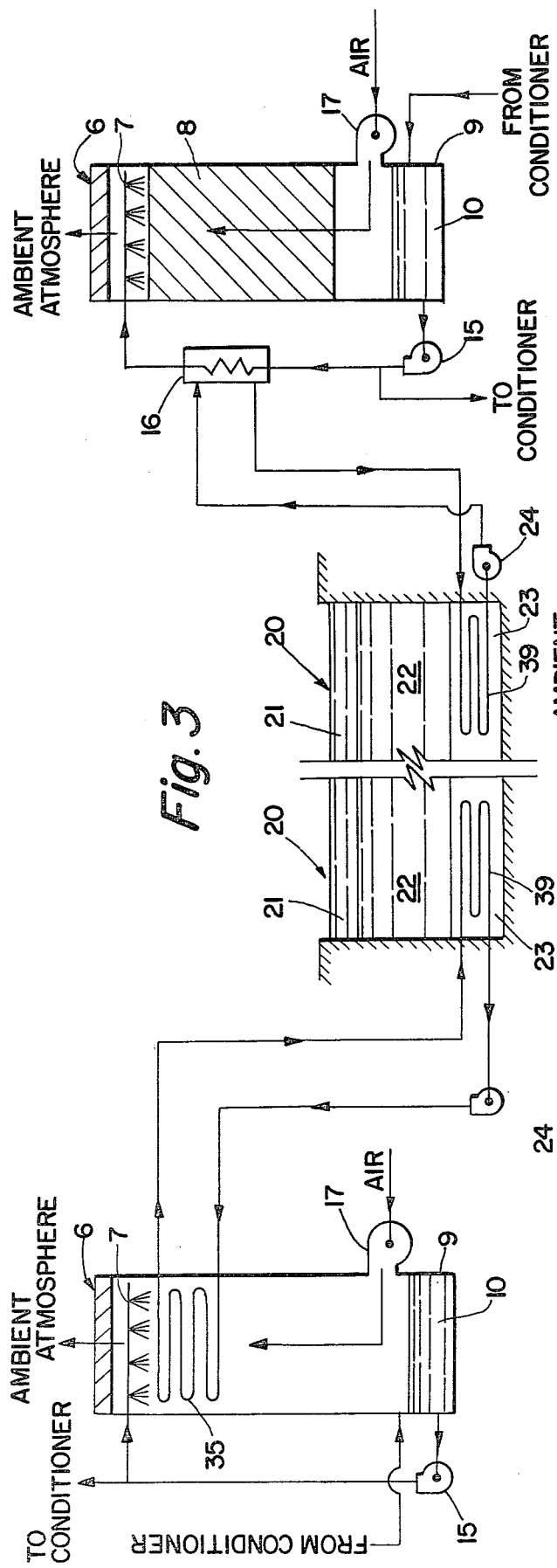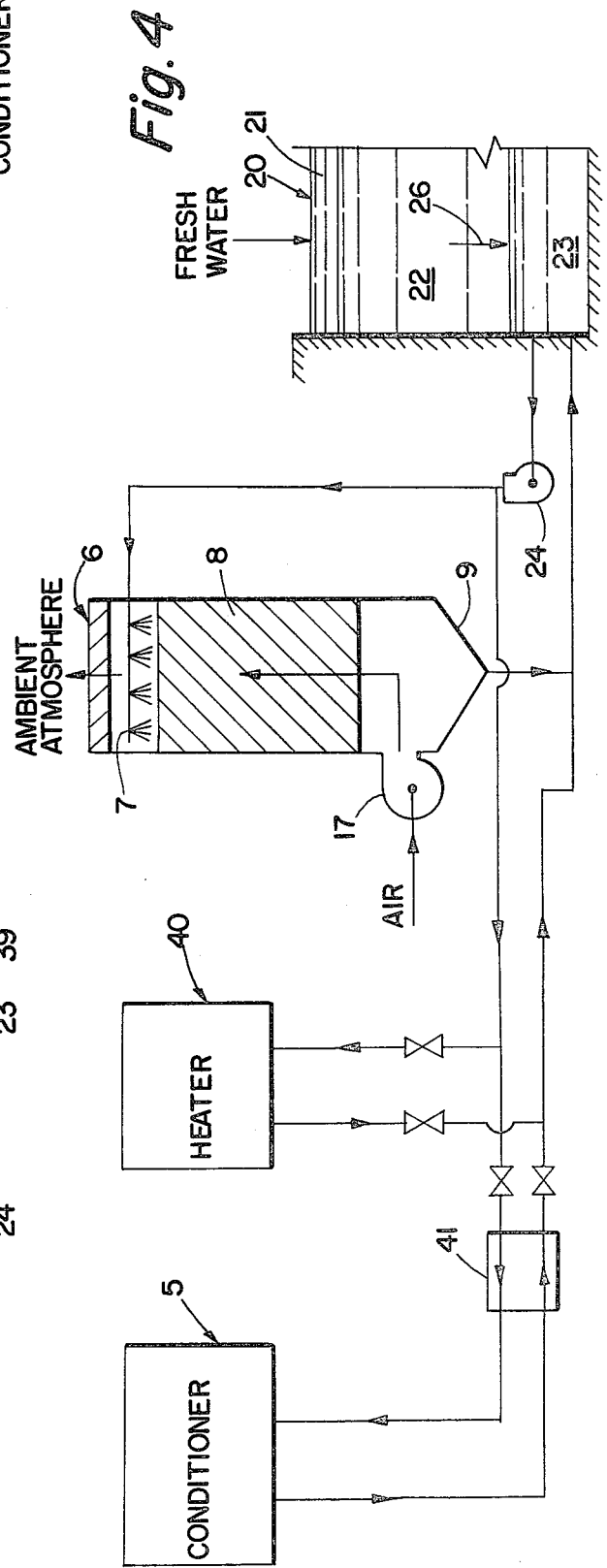

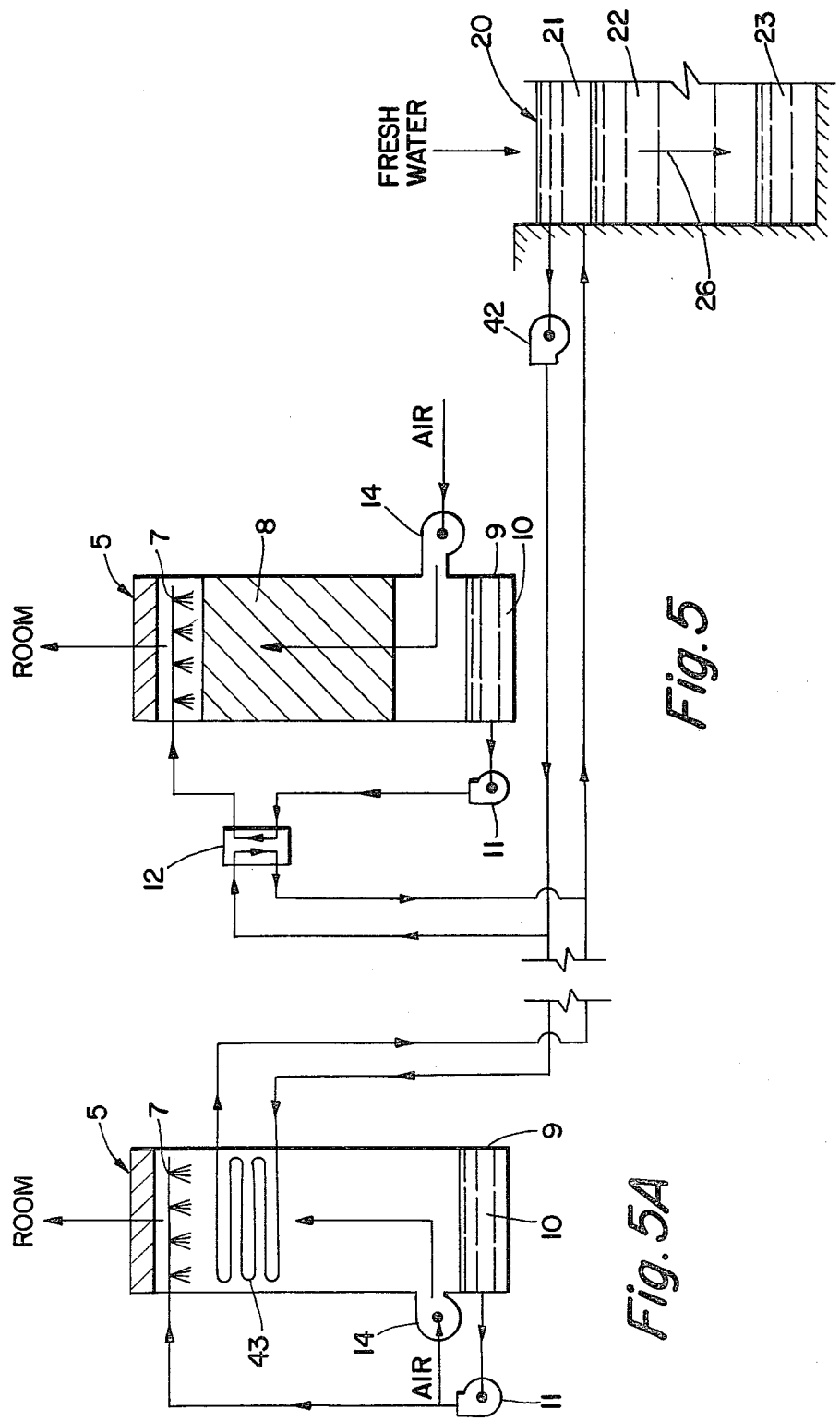

SYSTEM OF MOISTURE AND TEMPERATURE CONDITIONING AIR USING A SOLAR POND

BACKGROUND OF THE INVENTION

Today, because of the high cost and projected scarcity of oil and natural gas, there is a continuing effort to develop solar and geothermal energy, especially solar energy which appears to be more prevalent in most locations. One of the mechanisms employed to capture the energy of the sun is a solar pond which acts as a solar collector in which liquid, heated by the sun, is stored for subsequent use, especially on overcast days when the rays of the sun are shielded from the pond, or during long winter months at high latitudes when the sun's rays are not too effective because of the cold and the unfavorable azimuth angle of the sun.

Solar ponds utilize either fresh or salt water as a liquid. Solar ponds of brine are of the non-gradient type, where the concentration of salt is uniform throughout the depth of the pond, or of the gradient type, where the concentration of salt increases with depth of the pond. Gradient-type solar ponds of brine are usually deeper and are generally divided into three layers, e.g. (I) an upper convective layer having a depth of a few inches and a concentration of salt ranging from zero to a few percent, by weight, (II) a stable insulating layer typically having a depth of about three feet and a concentration of salt or salt gradient which increases with depth, the density gradient being positive downward in spite of increasing temperatures downward, thereby eliminating convection and loss of collected heat to the atmosphere, and (III) a lower convective layer, adjacent the bottom of the pond, typically having a depth of a foot or more and a concentration of salt equal to that of the bottom of the stable insulating layer. Typical temperatures of the brine in such ponds would range, for example, from 80° F. in the upper convection layer to 80°-180° F. in the stable insulating layer, to 180° F. in the lower convective layer during warm summer months. It can be appreciated from the above that a great deal of heating energy is capable of being stored in the lower convective layer of a gradient-type solar pond of brine. One disadvantage, however, is that the salt concentration gradient must be maintained in the stable insulating layer of the pond. Otherwise, the salt will uniformly disperse throughout the pond, thereby allowing the heated brine to rise to the surface of the pond by convection and diminish the effectiveness of the pond.

It has been found that solar ponds of the gradient type are particularly well suited for use in an air conditioning system which is manufactured by the Ross Air Systems Division of the Midland-Ross Corporation of Cleveland, Ohio, and sold under the trademark KATHABAR. This particular system of air conditioning employs a pair of vertically upright contactor towers, one of which towers is a conditioner wherein the air to be conditioned is contracted with a chilled liquid sorbent, such as lithium chloride, for moisture and temperature conditioning, and the other of which towers is a regenerator wherein liquid sorbent, diluted with moisture during the air conditioning process, is concentrated for return to the conditioner. The invention is directed to unique applications of a solar pond to the KATHABAR system of moisture and temperature conditioning of air.

Briefly stated, the invention is in a system of moisture and temperature conditioning air, and comprises means for moisture and temperature conditioning air with a liquid sorbent which becomes diluted with moisture upon contacting the air to be conditioned. A solar pond is provided for storing heating energy which is used in the concentration of diluted liquid sorbent.

Thus, the solar heat collector developed by nature is efficiently used to provide the heating requirements necessary for use in primarily concentrating liquid sorbent which becomes diluted in the KATHABAR process of air conditioning.

DESCRIPTION OF THE DRAWING

Other aspects of the invention will be apparent from the following description which will be better understood by having reference to the accompanying drawing, wherein:

FIGS. 1-6, 9 and 10 are schematic views of a KATHABAR air conditioner, or components thereof, used in conjunction with a solar pond, including unique apparatuses for maintaining the salt concentrations of the various layers of a gradient-type solar pond.

DETAILED DESCRIPTION OF THE DRAWING

Figure 6:
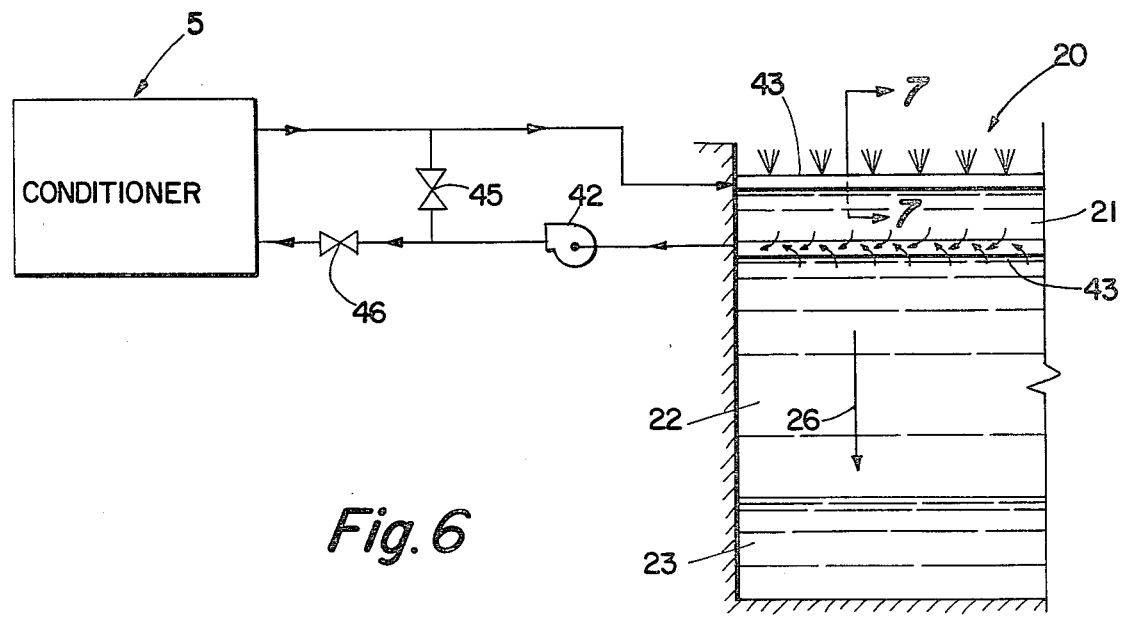

With general reference to the drawing for like parts and more particular reference to FIG. 1, there is shown a KATHABAR air conditioner, generally indicated at 4, which essentially comprises a pair of vertically upright towers 5,6, the first tower 5 being known as a conditioner because air is moisture and temperature conditioned in this particular tower, and the second tower 6 being known as a regenerator because in this tower the liquid sorbent, e.g. lithium or calcium chloride, which becomes diluted with moisture in the conditioner, is concentrated for return to the conditioner.

The conditioner 5 and regenerator 6 have essentially the same structural components of any suitable liquid distribution means, such as a spray nozzle 7 at the top of the tower through which liquid sorbent is directed downwardly, by spraying, against packing material 8 through which the liquid sorbent trickles downwardly, by gravity, into contact with air being circulated upwardly or horizontally through the packing material 8, depending on the particular design of the towers. The liquid sorbent falls from the packing material 8 into a sump 9 which is at the bottom of the tower.

In operation, liquid sorbent 10 is removed from the sump 9 of the conditioner 5 and circulated, under pressure, by means of a pump 11 through a cooling device 12 where the liquid sorbent is appropriately cooled for subsequent circulation to the spray nozzle 7 of the conditioner 5 from which the liquid sorbent is distributed, by spraying, onto the packing material 8. Air, for example, from a room 13 to be air conditioned, is circulated, under pressure, by means of a blower 14 through the packing material 8 in the conditioner 5 and into heat exchanging relationship with liquid sorbent trickling downwardly through the packing material. The air is simultaneously cooled, moisture conditioned and circulated from the conditioner 5 back to the room 13. The liquid sorbent meanwhile becomes diluted with moisture during the process and falls into the sump 9. A portion of the liquid sorbent from the sump 9 of the conditioner 5 is continuously removed and circulated to the sump 9 of the regenerator 6 from which a portion thereof is circulated, under pressure, by a pump 15 through a heating device 16 for heating and circulation to the spray nozzle 7 of the regenerator 6 for subsequent trickling through the packing material 8. Any suitable scavenger air, is circulated, under pressure, by means of a blower 17 through the packing material 18 of the regenerator 6 into heat exchange relation with the diluted liquid sorbent to concentrate the liquid sorbent by removal of the excess moisture. The now heated moisture laden air is removed from the regenerator 6 and, for example, discharged into the ambient atmosphere. The now concentrated liquid sorbent falls into the sump 9 of the regenerator 6 from which a portion is continuously removed and recirculated back to the sump 9 of the conditioner 5, under pressure, or by gravity, depending on the location of the two contactor towers. This is essentially a KATHABAR air conditioner 4 which utilizes any suitable liquid sorbent in the process of moisture and temperature conditioning of air.

A solar pond 20 is used in conjunction with the KATHABAR air conditioner 4 to provide the heating energy necessary in the concentration of the liquid sorbent which becomes diluted in the conditioner 5. The solar pond 20, in this instance, is filled with any suitable brine, e.g. sodium chloride, and is of the gradient type, wherein the concentration of salt increases with the depth of the pond. The solar pond 20 comprises an upper convective layer 21 having a very mild salt concentration, a stable insulating layer 22 of increasing salt concentration from top to bottom, and a lower convective layer 23 having the greatest salt concentration. As previously indicated, the salt solution in the lower convective layer 23 is heated to the greatest temperature. Accordingly, a portion of the brine from the lower convective layer 23 is continuously removed and circulated, under pressure, by means of a pump 24 through the heating device 16 into heat exchanging relation with liquid sorbent being circulated to the spray nozzle 7 of the regenerator 6. In this manner, the liquid sorbent is heated for subsequent contact with air at ambient temperature whereby the liquid sorbent is concentrated and returned to the conditioner 5 for reuse in the process of air conditioning air being circulated to a room 13.

Fresh water is continually added to the upper convective layer 21 of the solar pond 20 and caused to diffuse downwardly, as indicated by the arrow 26, through the pond at a rate equal to the diffusion rate of the salt which, thus, remains stationary, thereby creating a stable concentration gradient. This method of controlling the salt concentration within the solar pond is known as the "Falling Pond" method and derives its name from the diffusion of water downwardly in the pond.

Any suitable means 27 is provided for maintaining the concentration of salt in the various layers of the solar pond 20. In this instance, the means 27 comprises a concentrator tower 28 which also has the essential components of any suitable distribution means, such as a spray nozzle 29 that is positioned above packing material 30 which, in turn, is located above a sump 31. Brine from the lower convection layer 23 is removed and circulated, under pressure, by means of a pump 32 to the spray nozzle 29 from which the brine is distributed, by spraying, downwardly onto the packing material 30. Scavenger air, for example, is simultaneously circulated, under pressure, by means of a blower 33 vertically upwardly or horizontally through the packing material 30, depending on the particular design of the tower, into intimate heat and mass exchanging relation with the heated brine to remove the water which has diffused into the lower convective layer and increase the concentration of salt in the brine which then drops into the sump 31 from where it is removed and circulated, under pressure, or, by gravity, back to the lower convection layer 23 of the solar pond 20. The moisture laden air upon passage through the packing material 30 is removed from the concentrator 28 for discharge into, for example, the ambient atmosphere.

With reference to FIG. 2, the KATHABAR air conditioner 4 is essentially the same, except that a heating coil 35 is used in the regenerator 6 in place of the packing material 8. In this case, the hot brine from the lower convective layer 23 of the solar pond 20 is circulated through the heating coil 35 of the regenerator 6 instead of the heating device 16, as previously described. Diluted liquid sorbent is practically simultaneously heated and contacted with air, wherein the diluted liquid sorbent is concentrated for subsequent return to the conditioner 5 for reuse in the process.

The means 27 and method shown in FIG. 2 of maintaining the salt concentration in the solar pond 20, is slightly different from that shown in FIG. 1. For example, fresh water is continually added to the upper convective layer 21 of the pond and weak brine is continually extracted from the pond at the interface between the upper convective layer 21 and the stable insulating layer 22. The flow rates of fresh water added and weak brine extracted are adjusted to match the diffusion rate of salt upward, as indicated by arrow 36, through the pond. The weak brine is circulated, under pressure, by means of a pump 37 to the sump 31 of the concentrator 28, which sump 31 acts as a reservoir from which brine is circulated, under pressure, by means of a pump 38 to the spray nozzle 28 of the concentrator 28 for filtering downwardly through the packing material 30 into heat exchange relation with the air being simultaneously circulated upwardly therethrough for removing moisture from the brine and concentrating the salt therein. The concentrated brine returns to the reservoir or sump 31. A portion of the strong brine is removed from the sump 31 to the lower convective layer 23 of the solar pond 20, at a rate corresponding to the upper diffusion rate of the salt to maintain the gradient in a steady-state condition. This method of reconcentrating the salt solution is known as the "Rising Pond" method and derives its name from the diffusion of the salt upwardly. The rising pond method or the falling pond method can be used with either the packing-type towers of FIG. 1 or the coil-type towers of FIG. 2.

In the falling pond method indicated above, water diffuses downwardly through the stable insulating layer, and into the lower convective layer. The water is removed from the lower convective layer by withdrawing hot brine from the lower convective layer and contacting it with ambient scavenger air on an air-to-brine contact surface such as cooling tower fill. The hot brine, having a water vapor pressure very much greater than the ambient air, loses water by evaporation to the ambient air, and the brine is concentrated and evaporatively cooled. The hot brine also loses some heat via sensible heating of the air. The cooler and more concentrated brine is returned to the lower convective layer, and the scavenger air plus water evaporated from the brine is rejected to the atmosphere.

The falling pond concentrating method has the primary advantage of requiring a very small amount of contact surface and scavenger air to achieve a given evaporation rate, and hence, minimum hardware cost due to the very large difference in water vapor pressure between the hot pond brine and the ambient air. The primary disadvantage is that the heat of evaporation of the water from the pond brine is taken from the lower convective layer and hence reduces the overall thermal efficiency of the solar pond, typically by several percent.

The diffusion of water through the insulating layer is very slow, however, so removal of water from the lower convective layer need not be accomplished continuously. Re-concentration of the lower convective layer during the spring and fall, when the need for heat energy for building heating and cooling is at a minimum, will generally suffice for maintaining pond stability.

In the rising pond method indicated above, salt diffuses upwardly through the stable insulating layer, and into the upper convective layer. The salt is removed from the upper convective layer by withdrawing a portion of the very weak brine (typically 2% salt content or less) from the upper convective layer and transporting it to the concentrator. The transported weak brine is mixed with a reservoir of brine recirculated in the concentrator. Brine is withdrawn from the reservoir and contacted with ambient scavenger air on an air-to-brine contact surface such as cooling tower fill. Since the water vapor pressure of the brine is higher than the water vapor pressure of the scavenger air, the brine is concentrated by evaporation and returned to the reservoir. A volume of concentrated brine equal to the volume of transported weak brine less the evaporated water is withdrawn from the reservoir and transported to the lower convective layer of the solar pond. The concentration of the strong brine is higher than that of the lower convective layer, typically 20% or more if sodium chloride is used.

The rising pond concentrating method has the primary advantage of not requiring any collected solar heat from the lower convective layer to concentrate the brine. All the heat of evaporation is supplied by evaporative cooling of the scavenger air. The primary disadvantage is that the concentrator must be substantially larger than that required by the falling pond method for a given concentrating capacity, particularly in very humid climates, due to the reduced vapor pressure driving force available and the greater amount of water that must be evaporated for a pond of a given size.

With reference to FIGS. 3 and 3A, there are shown a heating coil-type regenerator and a packing-type regenerator that are used in conjunction with solar ponds 20 wherein similar heating coils 39 are located in the lower convective layers 23. A separate liquid is circulated through and between the heating coils 35 and 39 of the regenerator 6 and solar pond 20 of FIG. 3, and through and between the heating device 16 and heating coil 39 of the regenerator 6 and solar pond 20 of FIG. 3A. It should be apparent that the concentrators 27 of FIGS. 1 and 2 can be utilized to maintain the necessary concentration of salt in the solar ponds 20 of FIGS. 3 and 3A.

The hot brine from the lower convective layer of the aforementioned solar ponds is indirectly coupled to a KATHABAR air conditioner in that it is kept separate from the liquid sorbent used in the air conditioning process. The hot brine of the pond is only used in the concentration of liquid sorbent that becomes diluted with moisture during the air conditioning process. For this reason, an inexpensive brine such as sodium chloride can be used, compared to a liquid sorbent of lithium chloride which has superior dehumidifying capabilities. It can be appreciated that essentially all storage of energy is in the solar pond in the form of sensible heat in the lower convective layer of the pond. Indirect coupling of the KATHABAR system to such a solar pond is particularly attractive in hot, humid climates where a liquid sorbent of superior dehumidifying ability, but higher cost, is especially useful.

A solar pond saturated with salt, may be used in locations having ready, low-cost access to salts such as mangesium chloride and borax that have suitable stability characteristics. Saturated solar ponds maintain a stable density gradient by keeping each temperature level of the pond at saturation of the salt being used. Reductions in pond temperature due to heat extraction will cause a portion of the salt to change from liquid to solid phase, thereby releasing the chemical heat of fusion associated with the change-of-phase. For a given thermal storage capacity, the volume of the lower convective storage layer can be reduced. In a saturated pond, as best seen in FIGS. 3 and 3A, heat must be extracted via a secondary fluid through a heat transfer surface (typically an array of tubes), since at reduced temperatures the lower convective layer will consist of a mixture or slurry of brine and solid salt, precluding pumping it through a heat exchanger.

With particular reference to FIG. 4, there is shown a method, wherein the hot brine of the lower convection layer 23 of the solar pond 20, is directly coupled to the conditioner 5, i.e. used as the liquid sorbent for summer cooling and moisture conditioning air being circulated through the conditioner 5, or alternately, to any suitable heating apparatus 40 that is employed to heat air or liquid that is used in the winter heating of a room or building. Portions of the hot brine, e.g. lithium chloride, removed from the lower convection layer 23 of the solar pond 20, are separately circulated, under pressure, by means of a pump 24 to the conditioner 5, alternately to the heater 40, and the regenerator 6 which is used to concentrate the salt in the brine for return to the lower convective layer 23 of the solar pond 20. Brine from the solar pond and sump of the conditioner 5, may be circulated through a secondary heat exchanger 42 into heat exchanging relation to cool the hot brine to a sufficiently low temperature where the brine is suitable for use in the air conditioning process. Alternately, the hot brine from the lower convective layer 23 of the solar pond is circulated to the heating device 40 by means of a simple valving arrangement which diverts the brine to the heating apparatus 40 instead of the conditioner 5. The valving arrangement is also used to stop circulation of the hot brine to the heating apparatus and direct it to the conditioner 5. Generally, the regenerator is sufficient to maintain the concentration of salt within a gradient-type solar pond. However, in some instances, it may be desireable to use any of the aforementioned concentrators as a means to help maintain the salt concentration and stability of the solar pond 20.

The primary advantages of the aforementioned direct coupling method are threefold. Firstly, the need for sorbent brine-to-pond brine heat exchange equipment is eliminated, thereby reducing cost and improving performances, secondly, the inherent means of maintaining a stable density gradient within the solar pond at no additional equipment cost and, thirdly, the lower convective layer of the pond can be used for both cooling and heating energy storage in the form of concentrated brine thereby minimizing the depth and cost of the solar pond which is charged with a low-cost brine that has absorptive properties which are compatible with the liquid-sorbent air-conditioning process, such as $CaCl_2$. The direct-coupling concept utilizes the falling-pond method of achieving a stable density gradient.

In operation, water diffuses downwardly through the stable insulating layer and into the lower convective layer. Hot brine containing this diffused water is withdrawn from the lower convective layer. During summer operation, a portion of the withdrawn brine is transported to the liquid sorbent conditioner, another portion is transported to the winter heating system when building heating is required, and a third portion is transported to the liquid sorbent regenerator. When the liquid sorbent conditioner is absorbing water for the purpose of building cooling or heating, a portion of brine diluted by the absorbed moisture is withdrawn from the conditioner. This diluted brine may be passed in heat exchange relationship with the portion of hot brine transported to the conditioner, thereby cooling the hot brine and heating the diluted brine and improving the thermal efficiency of the system. In the regenerator, the hot brine is contacted with a scavenger airstream on a brine-to-air contact surface such as cooling tower fill. The scavenger airstream typically consists of outside ambient air, building exhaust air, or a mixture of the two. The hot brine, having a water vapor pressure very much greater than the water vapor pressure of the scavenger airstream, is concentrated by evaporation of water into the scavenger airstream. The amount of water evaporated is equal to the amount of water diffusing downward through the solar pond plus the amount of water absorbed in the conditioner. The brine thus concentrated in the regenerator is mixed with the diluted brine withdrawn from the conditioner, and is transported to the lower convective layer of the solar pond. The concentration of the brine returned to the solar pond is higher than the concentration of the lower convective layer, allowing it to absorb the water diffusing downward in the solar pond.

The liquid sorbent regenerator thus automatically serves the dual purpose of providing a means of brine concentration for the liquid sorbent conditioner, and a means of maintaining a stable density gradient within the solar pond, without the need for additional equipment and without the need for pond brine-to-sorbent brine heat exchange equipment. It should be noted that the rate of water absorption in the conditioner and the rate of water diffusion in the solar pond need not be in instantaneous balance with the rate of water evaporation in the regenerator. The depth of the lower convective layer (and hence its water absorptive capacity) can be varied by design to require an overall balance of water flows only on a weekly, monthly, or even seasonal basis, while still maintaining a stable density gradient within the solar pond. The lower convective layer thus serves as an energy storage reservoir for both sensible heat (brine temperature) and latent absorption (brine concentration).

With reference to FIGS. 5 and 5A, there is shown a system for advantageously using the upper convective layer 21 of the solar pond 20 as a heat sink for the liquid sorbent conditioner 5. For example, water or brine in the upper convective layer 21 is removed from the solar pond 20 and circulated, under pressure, by means of a pump 42 to a cooling coil 43 of a coil-type conditioner 5, or to the cooling device 12 of a packing-type conditioner 5, wherein the brine receives the latent heat of condensation associated with the dehumidifcation process and possibly some sensible heat associated with air cooling. The now warmed brine is returned to the upper convective layer 21 of the solar pond 20 where it is cooled by evaporation to the atmosphere. The solar pond thus serves as a heat source as well as an energy storage reservoir for the liquid sorbent regeneration process and as a heat sink for the liquid sorbent dehumidifier. It is known that the temperature of a natural body of water is typically within a few degrees of the average wet-bulb temperature of the atmosphere. Since less total heat is being rejected to the atmosphere from a solar pond utilized as described above, it is expected that the temperature of the upper convective layer would approach the ambient wet-bulb temperature even more closely and would, in fact, have a lower temperature than would be available from a cooling tower of typical sizing, thus enhancing the performance of the liquid-sorbent process.

Figure 7:
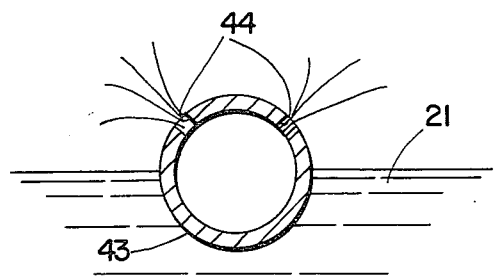
FIG. 7 is a cross-section of a pipe as viewed from the plane indicated by the line 7—7 of FIG. 6.

With particular reference to FIG. 6, there is shown a method of utilizing the upper convective layer 21 of a solar pond as a cool water storage reservoir. The upper convective layer can be designed for any desired depth by locating the cool water withdrawal means at, or slightly above, the interface between the upper convective layer 21 and the stable insulating layer 22, when the falling pond method of density gradient maintenance is used. Due to the large surface area of a typical solar pond, the cooling storage capacity of the upper convective layer is quite high per unit depth. For example, an upper convective layer about 16 inches deep would experience a temperature rise of only 1° F. per hour, when utilized as a conditioner heat sink, if no heat were rejected from it to the atmosphere. Also shown is an arrangement which enhances the evaporative cooling of the water in the storage reservoir. Cool water is extracted from the bottom of the upper convective layer by any suitable means, e.g. a pattern of pipes 43 with perforations 44, as best seen in FIG. 7, when cooling is required in the conditioner. At least a portion of the extracted water is supplied to the conditioner. A portion of the cool water may be diverted by a valving arrangement, including valves 45,46, from the conditioner 5 and mixed with the warm water return from the conditioner, thus increasing the total flow of water to the surface distribution system which is designed to spray the water into the air to enhance evaporative cooling. When a favorable wet-bulb temperature exists in the atmosphere and little or no cooling is required (typically during the night), the supply of cool water to the conditioner may be radically reduced or stopped while maintaining full flow to the surface distribution system to further cool the upper convective layer and thus store cooled water for use the following day. Using the aforementioned arrangement, it is possible to attain a maximum cool water supply temperature within 3+ or 4° F. of the average atmospheric wet-bulb temperature over a 24-hour period.

Figure 8:
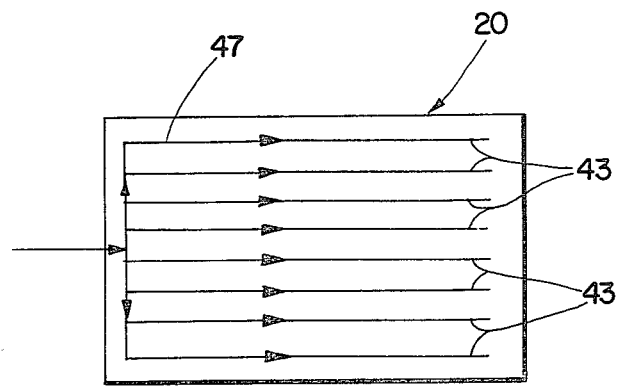
FIG. 8 is a plan view of a piping arrangement used to return liquid to a solar pond.

High winds can create wave action in an uncovered solar pond 20 to disturb the stability of the pond by causing a rapid diffusion of the salt in a gradient-type solar pond. Such wave action is broken up by floating, or otherwise positioning, on the surface of the solar pond, a piping arrangement 47 (FIG. 8) which is composed of a plurality of individual perforated pipes 43, as previously described. The perforations are in the upper portions of the pipes so that the water out of the water is aerated, as it sprays upwardly from the perforations 44 into the atmosphere (FIG. 7) to enhance evaporative cooling of the water and consequent cooling ability of the upper convective layer of the pond.

Figure 9:
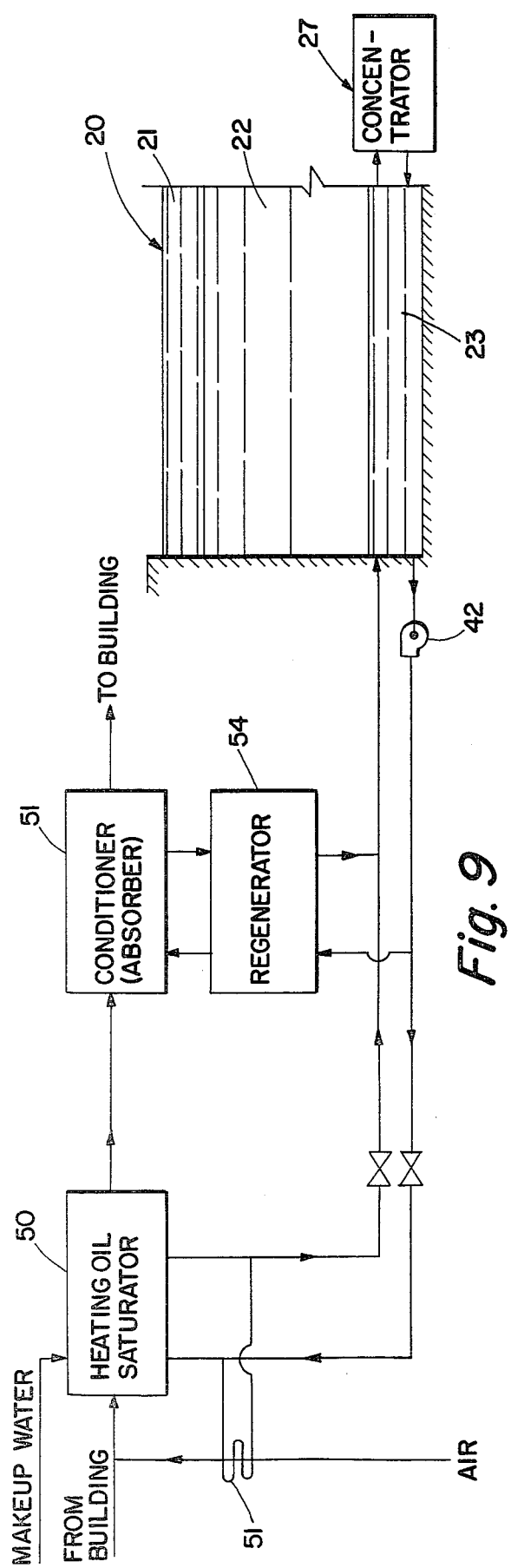

Solar ponds offer a relatively inexpensive means of seasonal storage of heat for winter heating. However, at latitudes and locations having substantial building heating loads, the temperature of the lower convective layer 23 will typically fall to as low as 80° F. to 85° F. toward the end of the seasonal heat extraction cycle. This is generally too low a temperature level for building temperature control via indirect air heating in coils or the like. With reference to FIG. 9, there is shown an arrangement in which the solar pond 20 supplies all the heating energy for direct winter heating. The basic elements include a combination heating coil saturator 50 which is coupled, in series, with a liquid sorbent conditioner 51. In operation, return air from a building, plus any outside air required for proper building ventilation, enters the heating coil saturator 50. In large systems and/or in very cold climates, it may be advantageous to utilize a heat coil 51 for sensibly preheating the outside ventilation air. The heating coil saturator 50 typically consists of an extended surface coil with means for distributing and recirculating evaporative water over its airside surface and means for passing warm brine withdrawn from the lower convective layer 23, through its tubes.

When the temperature of the lower convective layer is high enough to satisfy the building heating requirements by sensible air heating alone, the evaporative water system and the liquid sorbent conditioner are inoperative. When the temperature of the lower convective layer 23 falls below that required for direct sensible air heating, the evaporative water system and the liquid sorbent conditioner 51 are placed in operation to achieve thermochemical heat pumping. Building heating can be accomplished with lower convective layer temperatures as low as 75° F., while simultaneously utilizing the latent heat storage capability of the concentrated brine in the lower convective layer 23 via the liquid sorbent conditioner 51. This significantly reduces the depth and cost of the lower convective layer when compared to concepts which utilize sensible heating only, and extends the geographical areas of application of solar ponds to climates heretofore considered too cold for their use.

Further reductions in solar pond depth and cost or increases in solar pond heat storage capacity for a given depth can be achieved by utilizing a saturated solar pond, wherein a substantial percentage of the salt in the pond has solidified by the end of the winter heating season. In this way sensible heat is stored in the lower convective layer 23 and additional heat of fusion is stored in the lower convective layer and the stable insulating layer 22.

Figure 10:
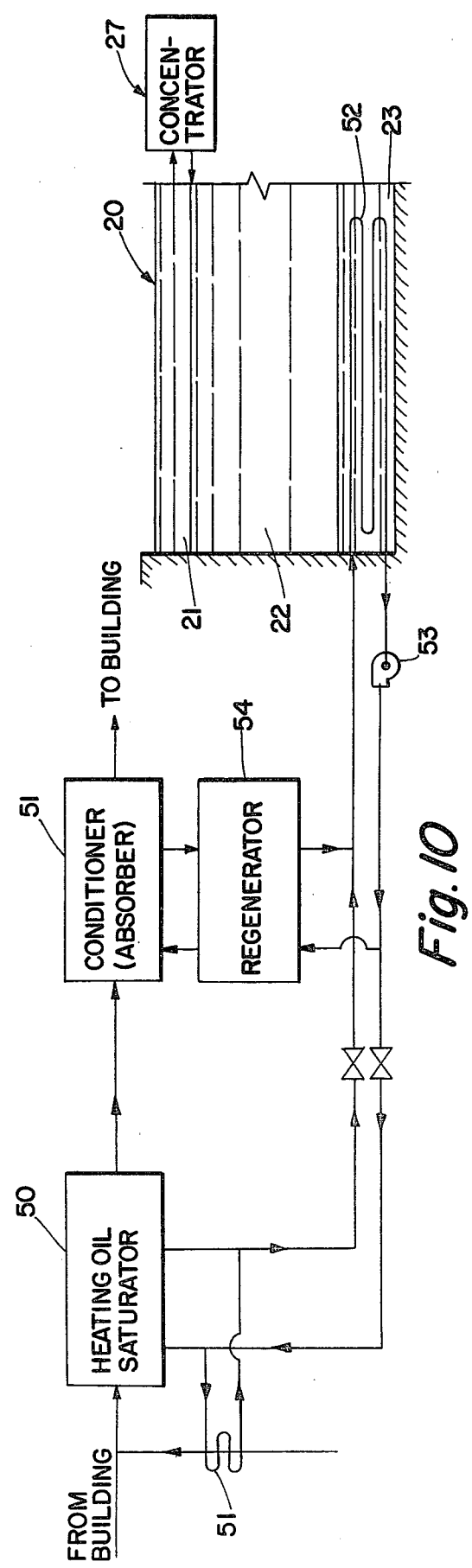

With particular reference to FIG. 10, there is shown an arrangement for utilizing a saturated solar pond for winter heating. The system is quite similar to that described in FIG. 9, except that a secondary heat transfer fluid is utilized to extract heat from the lower convective layer 23 by means of a heating coil 52 through which the secondary heat transfer fluid is circulated for heating and subsequent circulation, under pressure, by means of a pump 53 to the heating coil saturator 50 and to the conditioner 51 via the regenerator 54. In the indirect winter heating method, heat must also be supplied to the liquid sorbent regenerator whenever the system is being operated as a thermochemical heat pump, since the liquid sorbent brine is independent of the pond brine. The indirect method of winter heating with a saturated solar pond has the advantages of reduced pond depth and cost for a given heat storage capacity, and the ability to independently use a more expensive liquid sorbent of superior characteristics for a thermochemical heat pumping in the liquid sorbent system. However, this system has the disadvantage of requiring heat transfer means, e.g. coil 52, in the lower convection layer to effect heat extraction. The indirect method is best suited for warmer, more humid climates where an independent sorbent brine system is desireable for superior summer cooling performance, and the indirect system can be utilized for winter heating also to keep pond depth and cost to a minimum.

The aforementioned solar ponds have a salt concentration gradient which maintains the stability of the pond, thereby minimizing conductive and evaporative heat losses to the atmosphere. A concentrator or a regenerator, depending on the process, must be used to maintain the salt concentration gradient in the solar pond. This particular arrangement eliminates the need for a cover or glazing over the surface of the pond.

Figure 11:
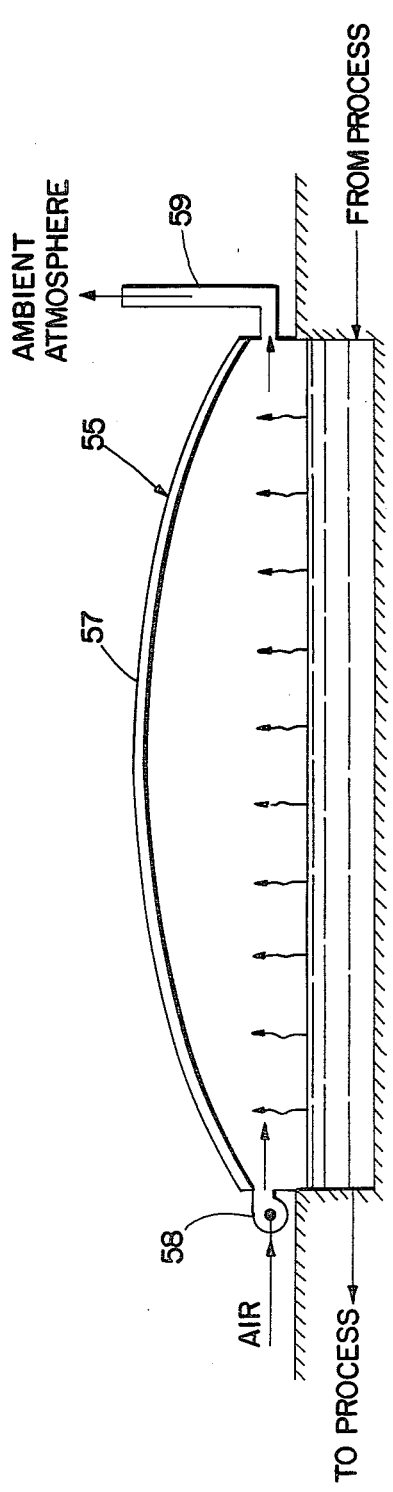
FIGS. 11 and 12 are schematic, sectional side views of different solar ponds.
Figure 12:
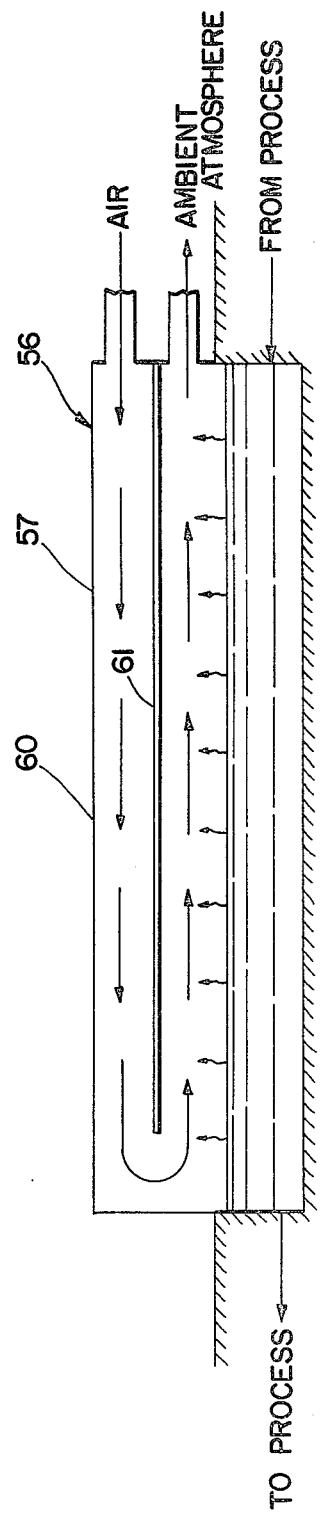

With reference to FIGS. 11 and 12, there are shown two different shallow solar ponds 55,56 which are of the non-gradient type and filled with any suitable liquid sorbent brine. Any suitable glazing 57, e.g. layers of transparent plastic film, may be used as a cover for the solar ponds 55,56. The concentration of the sorbent brine in the solar ponds is at least as great as the concentration of the sorbent brine in the conditioner in connection with which the solar ponds 55,56 are used. The dew point humidity of the air in contact with the surface of the pond is typically 30° F. to 45° F. lower than the temperature of the pond surface. Consequently, the surface temperature of the glazing in contact with this air can be 30° F. to 45° F. lower than the surface temperature of the brine in the pond without condensation occurring. This effectively eliminates condensation as a design consideration, and allows the design of the pond and its glazing to, instead, be optimized on the basis of radiant energy transmission vs. conductive and convective heat losses, thereby substantially reducing the cost and increasing the effectiveness of the solar pond.

Heated brine from the solar ponds 55,56 may be used in a separate regenerator unit, and the solar pond may be utilized for concentrated brine storage in the manner, as previously described. Alternatively, the shallow non-gradient solar pond may also serve as the sorbent brine regenerator or concentrator. For example, during periods of favorable isolation and when concentration of the sorbent brine is needed, scavenger air, consisting of outside air, building exhaust air, or a mixture of the two, may be introduced beneath the glazing in contact with the surface of the sorbent brine. Since the water vapor pressure of the warm sorbent brine is higher than the water vapor pressure of the scavenger air, water evaporates from the brine surface. The moisture laden scavenger air is vented to the atmosphere. If concentration of the sorbent brine is not required, the flow of scavenger air may be stopped, and the collected solar energy may be stored in the form of a heat for subsequent use.

The flow of scavenger air across the sorbent brine surface may be provided by any suitable fans, e.g. fan 58, or by natural convection with the utilization of a stack 59. In any glazed solar collector or pond there are unavoidable heat losses through the glazing due to conduction and convection from the warm interior of the collector to the relatively cool atmosphere. The heat losses can be minimized and thermal efficiency of the solar pond regeneration process can be improved by utilizing an upper or outer glazing 60 (FIG. 12) that consists of one or more layers of glass, plastic film or the like. Scavenger air is forced to circulate between the upper glazing 60 and a lower glazing 61 before contacting the surface of the sorbent brine. In this way, the scavenger air is preheated by utilizing at least a portion of the heat that would otherwise have been transmitted through the glazing to the atmosphere.

Thus, there has been described an air conditioning and/or heating system in combination with a solar pond, especially of the gradient type where a concentrator or regenerator is employed to maintain the concentration of salt in the brine of the solar pond.

What is claimed is:

1. A system of moisture and temperature conditioning air, comprising:
   (a) a first tower, comprising (I) means for simultaneously moisture and temperature conditioning air circulated through the tower, including distribution means adjacent the vertically uppermost top of the tower for directing liquid sorbent downwardly into contact with air circulating through the tower, and (II) a first sump adjacent the vertically lowermost bottom of the tower in which liquid sorbent, diluted with moisture, collects after it moves downwardly through the tower;
   (b) a vertically elongated second tower in which diluted liquid sorbent is concentrated, the second tower being in spaced relation from the first tower and comprising, (I) means for evaporating water from the liquid sorbent into air circulated through the second tower, including distribution means for directing liquid sorbent into contact with the air, and (II) a second sump in which liquid sorbent collects after it moves downwardly through the second tower;
   (c) means for circulating liquid sorbent between the first and second sumps;
   (d) a solar pond, remote from the towers, including a liquid which is heated by the sun and in which heating energy is stored, the pond having a bottom which is spaced from an upper surface which is closer the sun, the liquid of the pond being a brine solution having a concentration of salt which increases with the depth of the pond;
   (e) means for using heating energy from the solar pond to evaporate water from the sorbent brine into air circulated through the second tower; and
   (f) means for maintaining the concentration of salt in the pond.

2. The system of claim 1, wherein the means for maintaining the concentration of salt in the pond, includes:
   (I) a third tower;
   (II) distribution means adjacent the vertically uppermost top of the third tower for directing brine downwardly through the tower;
   (III) means adjacent the vertically lowermost bottom of the third tower for collecting brine which passes downwardly through the third tower;
   (IV) means for removing heated brine adjacent the bottom of the pond to the distribution means for direction therefrom; and
   (V) means for circulating air through heated brine passing downwardly through the third tower to concentrate the brine by removing moisture therefrom as the air contacts the brine.

3. The system of claim 1, wherein the means for maintaining the concentration of salt in the pond, includes:
   (I) a third tower;
   (II) distribution means adjacent the vertically uppermost top of the third tower for directing brine downwardly through the tower;
   (III) means adjacent the vertically lowermost bottom of the third tower for collecting brine which passes downwardly through the third tower;
   (IV) means for removing liquid from adjacent the upper surface of the pond to the brine collecting means of the third tower;
   (V) means for circulating brine from the collecting means of a third tower to the distribution means for direction therefrom; and
   (VI) means for removing brine from the collecting means of the third tower to the solar pond adjacent the bottom thereof.

4. The system of claims 1, 2 or 3, wherein the first and second towers each include packing material which is between the distribution means and sump and through which liquid sorbent trickles downwardly, by gravity, and the means for simultaneously moisture and temperature conditioning air in the first tower includes means exteriorly of the first tower for cooling liquid sorbent, prior to circulation of the sorbent to the distribution means, and the means to concentrate liquid sorbent in the second tower includes means for circulating heated brine from adjacent the bottom of the pond into heat exchanging relation with diluted liquid sorbent, prior to circulation of said sorbent to the distribution means of the second tower.

5. The system of claims 1, 2, or 3, wherein the first tower includes a cooling coil and the second tower includes a heating coil, the coils being closely spaced vertically below the distribution means, and the means for simultaneously moisture and temperature conditioning air in the first tower includes means for circulating a cool fluid through the cooling coil of the first tower, and the means to concentrate liquid sorbent in the second tower includes means for circulating heated brine from adjacent the botom of the pond through the heating coil in the second tower.

6. The system of claim 1, wherein the means to concentrate liquid sorbent in the second tower includes means disposed in the pond adjacent the bottom thereof, through which a liquid, separate from the brine and liquid sorbent, is circulated into heat exchanging relation with heated brine adjacent the bottom of the pond, for heating and subsequent circulation into heat exchanging relation with diluted liquid sorbent, to heat said diluted liquid sorbent, prior to circulation to the distribution means in the second tower.

7. The system of claim 1, wherein the means to concentrate liquid sorbent in the second tower includes means disposed in the pond adjacent the bottom thereof, through which a liquid, separate from the brine and liquid sorbent, is circulated into heat exchanging relation with heated brine adjacent the bottom of the pond, for heating and subsequent circulation through a heating coil in the second tower, the heating coil being closely spaced vertically below the distribution means.

8. The system of claim 1, wherein the means to concentrate liquid sorbent in the second tower includes means for circulating brine from adjacent the bottom of the pond to the distribution means of the second tower for direction therefrom.

9. The system of claim 1, wherein the means for moisture and temperature conditioning air in the first tower includes, means for circulating cool liquid from adjacent the upper surface of the pond into heat exchanging relation with liquid sorbent to cool the liquid sorbent prior to passage of the liquid sorbent to the distribution means for direction therefrom.

10. The system of claim 9, which includes means for alternately using heated brine from adjacent the bottom of the pond in the heating of air being circulated to a room or building.

11. The system of claim 9, which includes a pattern of pipes on the upper surface of the pond, the pipes having perforations through which liquid is returned to the solar pond after use in the first tower.

12. The system of claim 1, which includes means for simultaneously heating and humidifying air from a space to be heated, to increase the enthalpy of said air, prior to circulation of said air to the moisture conditioning means whereat the increased enthalpy of the heated and humidified air is converted into sensible heat, said heating and humidifying means including means for circulating liquid from adjacent the bottom of the pond into heat exchanging relation with said air from the space.

13. The system of claim 12, wherein the heating and humidifying means includes means for simultaneously wetting said air from the space.

* * * * *